INVENTORS
JAMES M MILLS &
FLOYD E COOMER
BY Jeffers and Young
ATTORNEYS

March 24, 1970 — J. M. MILLS ET AL — 3,502,214

CHECK VALVE FOR FILTER APPARATUS

Filed March 4, 1968 — 2 Sheets-Sheet 2

INVENTORS
JAMES M MILLS &
FLOYD E COOMER
BY Jeffers and Young
ATTORNEYS

United States Patent Office 3,502,214
Patented Mar. 24, 1970

3,502,214
CHECK VALVE FOR FILTER APPARATUS
James M. Mills and Floyd Coomer, Cookeville, Tenn., assignors to Bowser, Inc., Fort Wayne, Ind., a corporation of Indiana
Filed Mar. 4, 1968, Ser. No. 710,045
Int. Cl. B01d 35/12
U.S. Cl. 210—136   7 Claims

ABSTRACT OF THE DISCLOSURE

Check valve for filter apparatus using a plurality of filter cartridges and wherein a filter cartridge in proper operative position will open its pertaining check valve, whereas a filter cartridge not in proper position or removed from the apparatus will permit its pertaining check valve to close.

Background of the invention

This invention relates to filter apparatus and is particularly concerned with filter apparatus of the type in which a plurality of individual filter cartridges are placed and which operate in parallel.

Filter apparatus employing a plurality of separate filter cartridges through which the material being filtered flows in parallel relation are known. Such filter apparatus requires that the filter cartridges be replaced on occasion with fresh ones, or for the reason that a filter cartridge has failed, and the present invention is most particularly concerned with a novel check valve arrangement for use for such filter apparatus which is cartridge operated and which will close off the exit passage supplied by the respective filter cartridge if the filter cartridge is absent or is not properly mounted within the filter apparatus.

Filter apparatus of the nature referred to is widely employed in industry, and there are many instances in which the highest quality of the filtered product is required. In these instances it is not permissible for there to be any chance for the filter apparatus to operate improperly and to permit unfiltered material to pass therethrough.

Having the foregoing in mind, it is a particular object of the present invention to provide a filter apparatus having replaceable cartridges therein in which the flow passage leading from a filter cartridge is automatically closed off if the cartridge is improperly mounted in the apparatus or is removed therefrom.

Another object of the present invention is the provision of a relatively simple check valve structure for use in association with replaceable filter cartridges which automatically closes upon removing the cartridges from filtering position and which automatically opens when the cartridge is returned to filtering position.

A still further object is the provision of a filter apparatus having a plurality of filter cartridges therein through which fluid being filtered flows in parallel wherein any one or more of the cartridges can be removed and the filter operated on the remaining cartridge without the possibility existing that unfiltered fluid will pass through the filter apparatus from the inlet side to the outlet side thereof.

A still further object is the provision of a check valve structure of the nature referred to which can be incorporated in existing equipment as well as in new manufacture.

The foregoing objects as well as still other objects and advantages of the present invention will become more apparent upon reference to the following detailed specification taken in connection with the accompanying drawings, in which.

Figure 1:
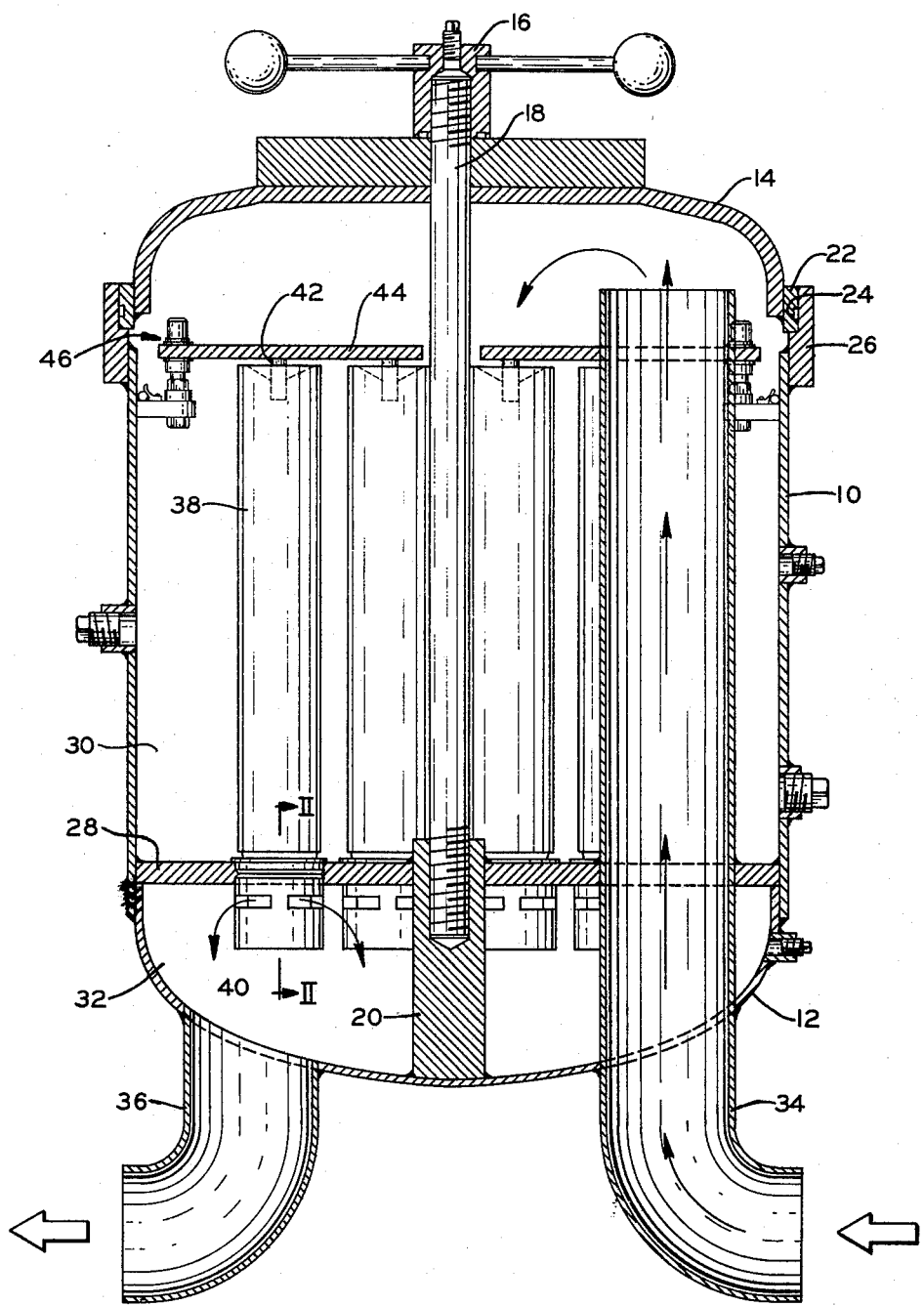
FIGURE 1 is a view, partly in section, of filter apparatus of the type adapted for having a check valve according to the present invention embodied therein.

Referring to the drawings somewhat more in detail, and with particular reference to FIGURE 1, a filter apparatus is shown therein which consists of a casing 10 having a bottom 12 welded thereon and having a cover 14 mounted thereon and held in place by a manually operable nut 16. Nut 16 threads on the upper end of rod 18 which extend axially through the filter and is anchored at its lower end to a post 20 fixed to bottom 12 and upstanding therefrom. The marginal portion of cover 14 carries a ring 22, the outer periphery of which embodies a seal element that seals inside a ring 26 fixed, as by welding, to the upper end of casing 10.

Mounted in the casing 10 toward the lower end thereof is a deck plate 28. The deck plate may be welded in position and divides the interior of casing 10 into an upper inlet chamber 30 and a lower outlet chamber 32. The fluid to be filtered is supplied to the upper inlet chamber 30 via an inlet conduit 34 while the filtered fluid is withdrawn from outlet chamber 32 via a conduit 36.

The fluid in passing from the chamber 30 to chamber 32 is required to pass through one of a plurality of filter cartridges 38 that extend axially in the filter apparatus in upstanding relation relative to deck plate 28.

The lower ends of the filter cartridge rest on respective check valves 40 which are carried by the deck plate, whereas the upper ends of the cartridges are engaged by the support pins 42 carried on a hold-down plate 44 positioned within casing 10 near the upper end and detachably retained in position by bolt means generally indicated at 46.

The exact nature of the hold-down plate and the filter cartridges is not important in respect of the present invention but are illustrated in some detail in the co-pending application, Ser. No. 492,452 entitled "Improved Safety Device for Filter Apparatus," inventors George J. Topol and John G. Vattay and filed Oct. 4, 1965, now Patent No. 3,406,827.

Figure 3:
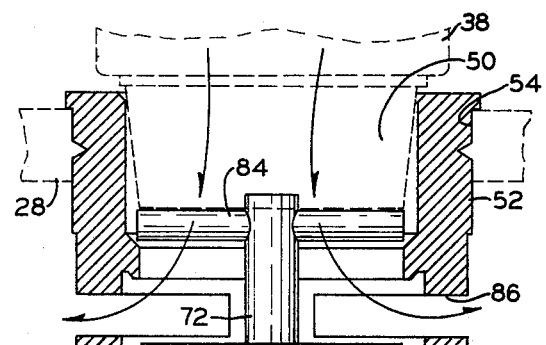
FIGURE 3 is a sectional view like FIGURE 2 but shows the position occupied by the check valve when the pertaining filter cartridge is in place.

As will be seen in FIGURE 3, each filter cartridge 38 has a lower end portion 50 thereon which may be tapered and which engages a cavity formed in the upper end of the body 52 of a check valve constructed in accordance with the present invention.

Each check valve is disposed in a respective aperture 54 in deck plate 28. The bodies of the check valve are preferably cemented in their respective apertures in the deck plate, as by epoxy cement, so as to seal between the inlet chamber 30 and outlet chamber 32.

Figure 2:
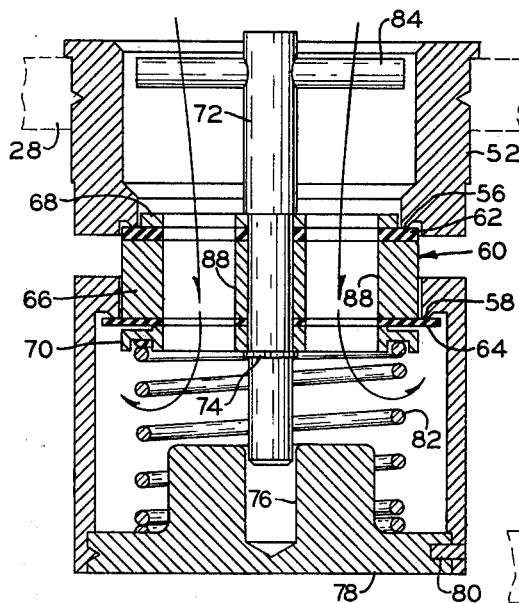
FIGURE 2 is a vertical sectional view indicated by line 2—2 on FIGURE 1 showing the check valve according to the present invention in the position which it occupies when the pertaining filter cartridge is removed.

As will be seen in FIGURES 2 and 3, each check valve body 52 has an upper annular seat region 56 and a lower annular seat region 58. Disposed within the check valve body is a reciprocable check valve member 60 having an upper disc 62 for engagement with seat 56 and a lower disc 64 for engagement with seat 58. The check valve comprised a central body part 66, an upper washer 68 and a lower washer 70 which together with discs 62 and 64 are mounted on a shoulder valve stem 72 and retained in position thereon by any suitable means, such as the snap ring 74.

Stem 72 has its lower end guided in a bore 76 formed in the lower closure member 78 for the check valve body and which closure member is sealingly mounted in a counter bore in the lower end of the check valve body as by being cemented therein by epoxy cement or the like. Pin means 80 may also be provided for locking closure member 78 in place.

A spring 82 bears between the underside of washer 70 of the check valve member and the upper side of lower closure 78 so as continuously to bias the check valve member toward seats 56 and 58.

Toward the upper end of the check valve body, stem 72 carries a cross pin 84 which, as will be seen in FIGURE 3, is adapted for engagement by the lower edge of the portion 50 on the lower end of the respective cartridge 58. It will be appreciated that when a cartridge 38 is properly mounted in position, the check valve member is held downwardly in its FIGURE 3 position so that filtered fluid emerging from the filter cartridge 38 via the portion 50, will pass through the lateral openings 86 of the check valve body into the outlet chamber 32 of casing 10.

However, when the filter cartridge is removed from the check valve body, spring 82 will urge the check valve member to its FIGURE 2 position wherein discs 62 and 64 engage their respective seats 56 and 58, thereby sealing off the openings 86 from the inlet side of the pertaining check valve. The check valve member has axial bores 88 extending completely therethrough so that pressure from the upper side thereof will pass to the underside and assist spring 82 in holding the check valve in sealing engagement with its seats. Seat 58 is larger in diameter than seat 56 so that there is always a greater upward thrust on the bottom face of the check valve member when the valve member is in its FIGURE 2 position.

However, when a check valve member is in its FIGURE 3 position, the thrust on the check valve member due to pressures in casing 10 is completely balanced.

From the foregoing, it will be seen that the relatively simple check valve arrangement of the present invention prevents improper operation of the filter apparatus by preventing fluid from passing through the filter apparatus unfiltered due to improper mounting of a filter cartridge. Furthermore, if a filter cartridge should be removed, due to failure thereof, the filter apparatus can continue in operation utilizing the remaining filter cartridges.

Figure 4:
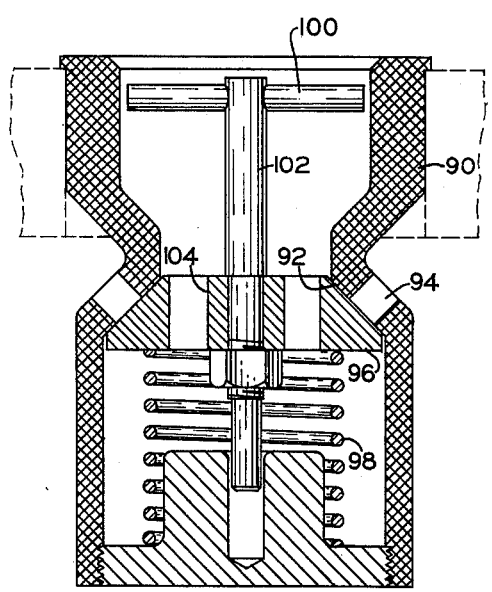
FIGURE 4 shows a somewhat modified check valve structure operating in the same manner as the check valve shown in FIGURES 2 and 3.

FIGURE 4 shows a modified arrangement in which a check valve is provided having a body 90 with a tapered seat region 92 therein provided with ports 94 adapted for being closed by tapered valve member 96 which is biased toward port closing position by spring 98 and which is adapted for being removed toward port opening position position by pin 100 in valve stem 102. The modification of FIGURE 4 has an annular seat region below the ports 94 and has a greater area on the bottom exposed to fluid pressure than on the top. Axial bores 104 in valve member 96 admit fluid from the upper side of the valve member to the lower side thereof.

It will be appreciated that the modifications of FIGURE 4 operate in exactly the same manner as the previously described modification.

In both modifications, the valve member is inserted into the valve body before the lower closure member is mounted in the valve body so as to permit inexpensive construction of the valve body.

We claim:
1. A filter apparatus comprising: a casing, a deck plate in the casing dividing the interior of the casing into inlet and outlet chambers, means for supplying fluid to be filtered to said inlet chamber, means for withdrawing filtered fluid from said outlet chamber, aperture means in said deck plate, filter cartridge means having an operative position wherein one end is sealingly clamped to said aperture means and the cartridge means extends into said inlet chamber so the fluid is required to pass through said cartridge means in flowing from said inlet chamber to said outlet chamber, check valve means in said aperture means normally closed and operated to open position by the placing of said cartridge means in proper operative position relative to said aperture means, and said check valve means including a bore so that pressure from the upper side thereof will pass to the under side of the check valve to provide upward thrust on the bottom of the check valve.

2. A filter apparatus according to claim 1 in which each check valve means comprises a body sealed to said deck plate and open at the end facing said inlet chamber to receive said one end of a respective said cartridge, port means in said body opening into said outlet chamber, a flow passage in said body connecting said open end thereof with said port means, seats in said body on opposite sides of said port means, a valve member in said body engageable with said seats, a spring urging said valve member toward said seats, and a stem on the valve member extending into said open end of the body so as to be engaged by a cartridge placed in operative position on the body and moved by the cartridge to move the valve member away from said seats.

3. A filter apparatus according to claim 2 in which said body is closed at the end opposite said open end thereof and said valve member has axial passage means extending therethrough to connect said open end of said body with the said closed end thereof.

4. A filter apparatus according to claim 3 in which the seat nearest said open end of the valve body is smaller in diameter than the seat most remote from said open end whereby fluid pressure supplied to the open end of the body when the valve member is in engagement with said seats will thrust the valve member toward said seats.

5. A filter apparatus according to claim 4 in which said seats are formed by axially spaced annular regions in said body and the end of the body opposite said open end is closed by a closure member attached to said body, said valve member being inserted into said body before said closure member is attached thereto.

6. A filter apparatus according to claim 5 in which said seats are in the form of axially spaced annular shoulders in said body on opposite sides of said port means.

7. A filter apparatus according to claim 5 in which said seats are in the form of axially spaced annular regions of a tapered position of the valve body, said port means being located in an intermediate region of said tapered portion between said annular regions.

References Cited

UNITED STATES PATENTS 3,317,048   5/1967   Kasten _____ 210—234

REUBEN FRIEDMAN, Primary Examiner

F. A. SPEAR, JR., Assistant Examiner

U.S. Cl. X.R.
210—234, 235, 323

-1050
(5/69)

UNITED STATES PATENT OFFICE
CERTIFICATE OF CORRECTION

Patent No. 3,502,214  Dated March 24, 1970

Inventor(s) James M. Mills and Floyd E. Coomer

It is certified that error appears in the above-identified patent and that said Letters Patent are hereby corrected as shown below:

Column 3, Line 50, cancel "position".

Column 4, Line 15, (Claim 1) after "bottom" insert

--- face ---.

SIGNED AND
SEALED
NOV 3 1970

(SEAL)
Attest:

Edward M. Fletcher, Jr.
Attesting Officer

WILLIAM E. SCHUYLER, JR.
Commissioner of Patents